(12) United States Patent
Hill

(10) Patent No.: US 11,610,049 B2
(45) Date of Patent: Mar. 21, 2023

(54) GENERATING STYLE CONFIGURATION FILES USING A LIBRARY OF STYLES

(71) Applicant: Jamison Hill, Logan, UT (US)

(72) Inventor: Jamison Hill, Logan, UT (US)

( * ) Notice: Subject to any disclaimer, the term of this patent is extended or adjusted under 35 U.S.C. 154(b) by 0 days.

(21) Appl. No.: 17/241,018

(22) Filed: Apr. 26, 2021

(65) Prior Publication Data

US 2022/0012408 A1    Jan. 13, 2022

Related U.S. Application Data

(63) Continuation of application No. 16/924,488, filed on Jul. 9, 2020, now Pat. No. 11,023,659.

(51) Int. Cl.
| | |
|---|---|
| *G06F 16/00* | (2019.01) |
| *G06F 40/14* | (2020.01) |
| *G06F 16/28* | (2019.01) |
| *G06F 40/154* | (2020.01) |
| *G06F 16/185* | (2019.01) |
| *G06F 16/13* | (2019.01) |

(52) U.S. Cl.
CPC ........... *G06F 40/14* (2020.01); *G06F 16/13* (2019.01); *G06F 16/185* (2019.01); *G06F 16/285* (2019.01); *G06F 40/154* (2020.01)

(58) Field of Classification Search
None
See application file for complete search history.

(56) References Cited

U.S. PATENT DOCUMENTS

| | | |
|---|---|---|
| 6,753,885 B2 | 6/2004 | Stoakley |
| 7,102,069 B2 | 9/2006 | Georges |
| 7,380,204 B2 * | 5/2008 | Lomelin-Stoupignan .................... G06F 16/972 715/234 |
| 7,398,472 B2 * | 7/2008 | Corrington ............... G06F 8/38 715/744 |
| 7,490,290 B2 | 2/2009 | White et al. |
| 8,010,937 B2 * | 8/2011 | Bertelrud .................. G06F 8/71 717/107 |
| 8,423,913 B1 | 4/2013 | Hogan et al. |
| 8,484,553 B2 | 7/2013 | Lloyd et al. |
| 8,762,355 B2 * | 6/2014 | Gutjahr ................... H04L 43/00 707/705 |
| 8,850,274 B2 * | 9/2014 | Eidelman ............ G06F 11/2268 714/57 |
| 9,003,279 B2 | 4/2015 | Peters et al. |
| 9,280,525 B2 | 3/2016 | Olszewski et al. |
| 9,519,630 B2 | 12/2016 | McWilliams |

(Continued)

*Primary Examiner* — Maikhanh Nguyen

(57) ABSTRACT

The present disclosure provides generating a style configuration file with and without parameters from a library of design values. As one non-limiting example, a website has certain styles that, when defined and combined, creates a full website design, such as, colors, color theme, button style, imagery, text inputs, font style, etc. These styles may be referred to as "top-level styles." Each "top-level style" is in fact a category for a range of possible inputs or values. The system and method of the disclosure can thus query a library of top-level style values, and with parameters, mix and match these values into "style configuration files." The style configuration files generated could then be used to produce a design visual by a rendering engine, wherein the design visual would reflect the styles of the values of the top-level styles in a configuration file.

16 Claims, 20 Drawing Sheets

(56) References Cited

U.S. PATENT DOCUMENTS

| | | |
|---|---|---|
| 9,607,057 B2 | 3/2017 | Mason et al. |
| 9,865,181 B2 | 1/2018 | Suley et al. |
| 10,048,971 B2 * | 8/2018 | Apte .................. G06F 9/44505 |
| 10,185,703 B2 | 1/2019 | Abrahami |
| 10,359,911 B2 | 7/2019 | Kulus et al. |
| 2004/0168123 A1 * | 8/2004 | Lomelin-Stoupignan ................... G06F 16/972 715/236 |
| 2004/0250204 A1 | 12/2004 | Isaacson |
| 2006/0174188 A1 * | 8/2006 | White .................. G06F 40/166 715/235 |
| 2006/0286536 A1 | 12/2006 | Mohler et al. |
| 2010/0162142 A1 | 6/2010 | Cooper et al. |
| 2011/0202829 A1 * | 8/2011 | Klassen .............. G06F 16/9577 715/243 |
| 2013/0198569 A1 * | 8/2013 | Eidelman ............ G06F 11/2268 714/32 |
| 2015/0128043 A1 | 5/2015 | Sim |
| 2016/0070813 A1 | 3/2016 | Unter Ecker et al. |
| 2016/0197964 A1 * | 7/2016 | Hou ........................ H04L 63/08 726/1 |
| 2017/0249177 A1 * | 8/2017 | Liggitt ...................... G06F 8/38 |

\* cited by examiner 1. output-type: website  — 501
2. count: 10
3. parameters: null

*FIG. 5*

1. output-type: website
2. count: 10
3. parameters:

★ top-level-style_01:

701 include: category_01 exclude: null

★ top-level-style_02:

include: value_04 value_06 exclude: null

★ top-level-style_03:

include: null exclude: value_09

*FIG. 7*

★ top-level-style_01:

```
include:  ■ category_01
exclude:  null
```
806

★ top-level-style_01:

```
include:  ■ category_01, .3
exclude:  null
```
807

★ top-level-style_01:

```
include:  ■ category_01, .3   ■ category_02, .2
exclude:  null
```
808

★ top-level-style_01:

```
include:  ▥ subcategory_01
exclude:  null
```
809

*FIG. 8B*

★ top-level-style_01:

```
include:   📁 subcategory_01, .3 exclude:   null
```
810

★ top-level-style_01:

```
include:   📁 subcategory_01, .3
           📁 subcategory_02, .3 exclude:   null
```
811

★ top-level-style_01:

```
include:   null exclude:   value_01
```
812

★ top-level-style_01:

```
include:   null exclude:   ■ category_01
```
813

*FIG. 8C*

★ top-level-style_01:

```
include:  null
exclude:  📁 subcategory_01
```
814

FIG. 8D

901 — output-type: `website`

902 — config-file_01:
- ★ top-level-style_01: `value_01`
- ★ top-level-style_02: `value_06`
- ★ top-level-style_03: `value_10`

903 — config-file_02:
- ★ top-level-style_01: `value_03`
- ★ top-level-style_02: `value_04`
- ★ top-level-style_03: `value_09`

904 — config-file_03:
- ★ top-level-style_01: `value_02`
- ★ top-level-style_02: `value_08`
- ★ top-level-style_03: `value_12`

*FIG. 9*

1001 — output-type: website
1002 — top-level-style: button-style
1003 — category: .rounded.harsh
1004 — name: Harsh Rounded Button Style
1005 — description: Lorem ipsum dolor sit amet, consectetur adipiscing elit, sed do eiusmod tempor incididunt psum dolor sit amet, consectetur adipiscing elit, sed do eiusmod tempor incididunt
1006 — image: https://cdn.collarbone.com/harsh-rounded
1007 — code:
```
.button-radius {
    border-radius: 50%;
}
```
1008 — dependent-values: input-style_.partial-round
1009 — function-parameters: n/a
1010 — assets: n/a
1011 — files: n/a
1012 — text: n/a
1013 — links: n/a

*FIG. 10*

1. output-type: website    *1301*
2. count: 4
3. parameters:    *1302*

★ color-theme:      *1303*
      include: bright   bright-dark
      exclude: *null*

★ button-style:      *1304*
      include: ■ round, .5
      exclude: *null*

★ font-style:      *1305*
      include: *null*
      exclude: ■ handwriting

*FIG. 13*

1401 — output-type: [website]

1406

1402 — config-file_01:
- ★ color-theme: [bright]
- ★ button-style: [round_style-1]
- ★ font-style: [source-sans-pro]

1403 — config-file_02:
- ★ color-theme: [bright-dark]
- ★ button-style: [square_style-1]
- ★ font-style: [museomoderno]

1404 — config-file_03:
- ★ color-theme: [bright-dark]
- ★ button-style: [round_style-1]
- ★ font-style: [lato]

1405 — config-file_04:
- ★ color-theme: [bright]
- ★ button-style: [p-round_style-2]
- ★ font-style: [crimson-text]

GENERATING STYLE CONFIGURATION FILES USING A LIBRARY OF STYLES

BACKGROUND OF THE DISCLOSURE

Field of the Invention

This disclosure is generally directed to generating a style configuration file with and without parameters from a library of values.

Background of the Invention

Designers lack the ability & time to generate a wide range of creative options to meet client needs. Every client has a particular set of requirements and expectations. Designers can only design for a certain range of creative options, and when those options do not make a client happy, friction can arise in the relationship. Accordingly, there exists a need for designers to have access to a system that will enable designers to produce a range of creative options not immediately obvious to the designer.

A designer often creates designs that reflect the work that has been well-received by a client he/she has engaged with in the past. Designers stick to a specific style because it's worked. In this way designers are often biased to the work they have done and rarely venture out into new styles of work. When a designer considers creating something for a new client, the designer struggles to resist the urge to judge and critique the creation of a design before it's finished, impacting the end result. This is not always a positive attribute of a designer. Unlike a computer which can, in an unbiased manner, mix/match and combine design styles into new creations efficiently and rapidly, a designer cannot help but critique and judge a design during the creation of the artifact. There thus also exists a need for a designer to be augmented in the creative process so an unbiased intermediary, such as a computer program, can create combinations and concepts for a client that are new, and without undue bias or critique.

Designers often do not have enough time to create a significant number of concepts for a client in order for the client to be certain they are pleased with any given aesthetic direction produced by the designer. There thus also exists a need for designers to be able to produce more concepts in less time.

Clients often lack the ability to communicate their design expectations to a designer. For example, clients often express, "I'll know it when I see it." A designer either must then create numerous options for review or engage in a lengthy question and answer process in order to determine how to proceed. This is often a time-consuming and inefficient process. There thus also exists a need to generate designs by a system and to learn from the user interactions of the observable designs to create new options that align with client expectations, needs and requirements, in less time.

Thus, it is desired to provide a method and system to overcome the above-mentioned disadvantages in the prior art and to allow users to generate a style configuration file from a library of values with and without parameters, which will then be used to produce one or more design visuals a user can observe and interact with.

SUMMARY OF THE INVENTION

The present disclosure provides generating a style configuration file with and without parameters from a library of values. As one non-limiting example, a website has certain styles that, when defined and combined, creates a full website design; such as, colors, color theme, button style, imagery, text inputs, font style, etc. These objects may be referred to as "top-level styles." Each "top-level style" is in fact a category for a range of possible inputs or values. The system and method of the disclosure can thus query a library of top-level style values, and with parameters, mix and match these values into "style configuration files." The style configuration files generated could then be used to produce a design visual by a rendering engine, wherein the design visual would reflect the values of the top-level styles found in the style configuration file.

Other features and aspects will be apparent from the following detailed description, the drawings, and the claims.

BRIEF DESCRIPTION OF THE DRAWINGS

FIG. 5 is a style configuration request without parameters or explicitly defined top-level styles but does include an output type.

FIG. 7 is a style configuration request which includes parameters, explicitly defined top-level styles, and an output type.

FIG. 8A, 8B, 8C, 8D illustrates parameter options in a style configuration request in one embodiment of the present invention.

FIG. 9 illustrates a sample style configuration file output from the system in one embodiment of the present invention.

FIG. 10 illustrates a value and its contents stored in a library in one embodiment of the present invention.

FIG. 13 illustrates a request to generate 4 style config files for a website output type from the library of values as illustrated in FIG. 12.

FIG. 14 illustrates the output config files produced from a request to generate 4 website style config files, as reflected in the request illustrated in FIG. 13.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
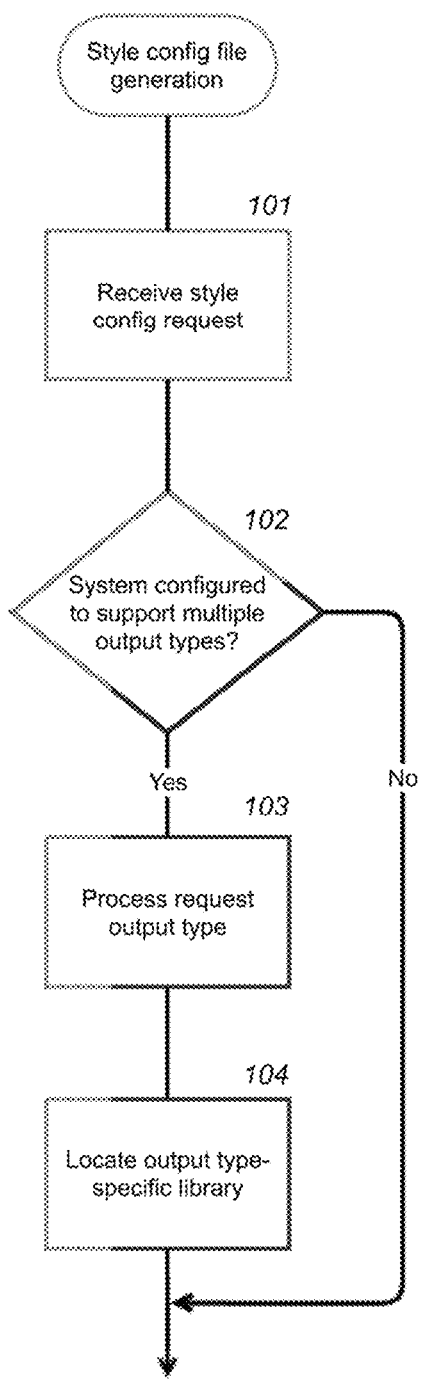
FIG. 1A, 1B illustrates a flow diagram to generate a style configuration file in one embodiment of the present invention.

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

The present disclosure provides style configuration file outputs based on variables starting from a library of values. As one non-limiting example, a website has certain objects that, when defined & combined, creates a full website design, such as, colors, color theme, button style, imagery, text inputs, font style, etc. These objects may be referred to as "top-level styles." Each "top-level style" is in fact a category for a range of possible inputs or values. For example, "button style" could have several distinct styles, such as large buttons, smaller buttons, buttons with rounded corners, buttons with square corners, buttons with an icon, buttons with no icon, etc. These are values that are possible options under a "top-level style" of "button style". A system and method to generate a style configuration file is thus provided.

A style configuration file is a set of styles that will dictate the visual style of a design visual. An example of a possible style config file follows:

config-file:
  "color-palette": "blue",
  "button-style": "style-1",
  "font-style": "inter-font"
}

A website has many style traits that make it unique. For example, as mentioned, a website has colors, buttons, fonts, etc. These elements are styles, or in the context of the disclosure, these are called "top-level styles," meaning they are values that each website needs defined to have a complete style. For these three top-level styles examples, there are variations in how they can be shown, There are many color styles, button styles, and font styles. These styles, or values, documented and saved would constitute an example of a "library."

The system might also need to produce a "style config file" that has at least one value populated for each "top-level style" to design a website. The present disclosure provides a system/method to create a combination of styles via a style config file by a software program.

In one example, a website designer may desire 20 website designs. The present disclosure provides a program that will look to a library for available styles under each "top-level style" and based on parameters or lack thereof, the system can generate a unique combination of values and produce 20 style config files. The program will mix/match values from each top-level style from the library and create unique combinations.

Another example of a possible style config file follows:
config-file:
  "color-palette": "blue",
  "color-theme": "bright",
  "button-style": "style-1",
  "imagery-style": "style-23",
  "text-inputs": "style-3",
  "font-style": "inter-font"
}

This configuration file dictates the theme-level styles of the holistic design of the website. The system will then follow another process to create a design visual from the configuration file (style config file). If there were 19 more config files that the system could produce a design visual of, the 20 website design visuals could be compared. Thus the present disclosure provides generating config files from a library of values with and without parameters.

The system and method of the disclosure can thus query a library of top-level style values, and with parameters, mix and match these values into "style configuration files." The style config files generated could then be used to produce a design visual, where the design visual would reflect the values of the top-level styles in the config file.

The disclosure thus provides a system/method that can generate a style configuration file from a library of design values. The ability to curate and dictate the precise nature of the output of a request to generate a style configuration file with parameters is disclosed. Sequence and dependencies of how library values are pulled into a style configuration file is also disclosed. In addition, the ability of a system to generate a design visual reflecting the styles of a config file for a user to observe is also provided.

Process a Request to Generate a Style Configuration File

Figure 1B:
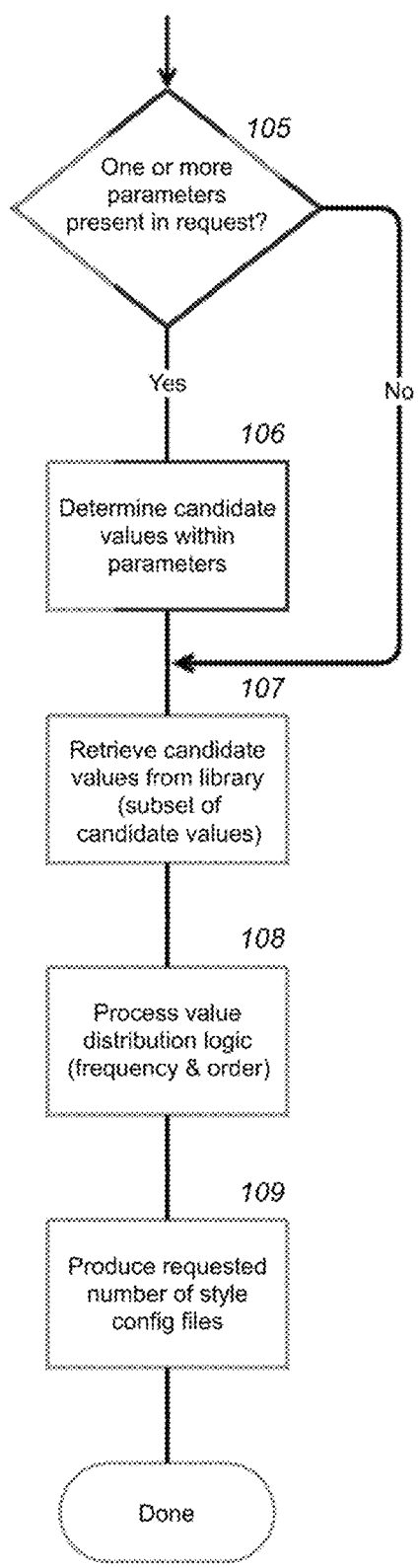

FIG. 1 illustrates a flow diagram to generate a style configuration file in one embodiment of the present invention. The system will receive a request 101 to produce one or more style config files. The system can receive a request by a user, a system or a user via a system. In an embodiment of the present invention, a system is configured to produce more than one output type of style config file. For example, a system may be configured to produce 2 output types, namely a style config file for a website (web page), and a style tile or themeboard (a visual abstraction of the styles used in a proposed web page design). In this case, the style config request will designate an output type of either "website" or "themeboard." If the system 102 is configured to produce more than one output type, the system will process the "output-type" data found in the style configuration file request 103 and locate the corresponding library of values 104 for the requested output type. If the system 102 is not configured to support more than one output type, the system may not need to process the "output-type" data from the request because it may be assumed or known by the system.

The system will process the parameters of a configuration file request 105. If parameters exist within a request, the system will determine the allowable subset of values, or candidate values, from the library 106. If no parameters exist within a request, all values in the library will be designated candidate values. An application for when no parameters are present might include when the system needs to produce a wide range style configs and design visuals of the style configs so a user can begin offering feedback on the styles they like/don't like. Prior to seeing a design visual, a user might not have anything to say about their likes and dislikes. Once the user sees the design visuals produced from style config files without parameters, they can begin interacting with the system to signal likes and dislikes, which will be observed and interpreted by the system into a set of parameters (See FIG. 11). These parameters will, in turn, be used to produce a refined set of style config files that reflect the previously-communicated likes and dislikes of the user.

The system will then retrieve the candidate values from the library 107, forming a subset of candidate values. All values in the library are not candidate values until the request parameters (or lack thereof) are considered. When a request to generate a style config is made, the system will process the parameters that will limit, exclude or distribute values for the style configs being generated. Any value from the library that is not excluded from the subset by parameters is considered a candidate value.

In an embodiment of the present invention, the system is configured to distribute the frequency of candidate values a certain way among the one or more requested config files 108. For example, if the system is requested to produce 10 config files, and a top-level style has 4 candidate values, the system would evenly distribute the 4 candidate values among the 10 config files requested. Two of the four candidate values would appear twice in the 10 config files for the top-level style, the other two of the four candidate values would appear three times in the 10 config files for that top-level style.

The system may also be configured to distribute the order of the candidate values among the one or more requested config files 108. For example, instead of the system producing the output config files where the order of the values reflects the order of the values in a library from where the values were sourced, the system could shuffle or randomize the order of the placement of candidate values among the subset of produced style configs, offering an organic or unpredictable matchup of output config value combinations.

Once the system has produced a subset of candidate values from the library 107, the system will use its distribution logic for frequency and order of top-level styles 108 and instructions from the config request 101 and produce the requested number of style config files 109. The produced style config files 109 will follow the presence or absence of parameters 105 as dictated in the style config request 101. There is not a specific form or format a style config file can take. In one embodiment of the present invention, it is preferred that a style config file is a file for a software program, such as a JSON (JavaScript Object Notation) file. However, a style config file can be software code, a file for a software program, text, an image or one or more combinations thereof.

In an embodiment of the present invention, a system can be requested to generate any number of style config files 109. For example, A user may request 20 style configs to be generated and the system produces 20 style config files. In an embodiment of the present invention, a rendering engine will then produce a design visual from the style config. The design visuals will reflect the values found in the style config files. The user can review all 20 design visuals and begin to see what he/she likes and does not like. The system can allow a user to interact with the 20 design visuals and signal what he/she likes and does not like. After the system receives the interaction data, it will translate the data into a set of parameters, which will inform the system to limit/exclude/distribute the candidate values across a new round of style config files so the next round of generated style configs and design visuals reflect the user's preferences.

Process a Request to Generate a Design Visual from a Style Configuration File

Figure 2A:
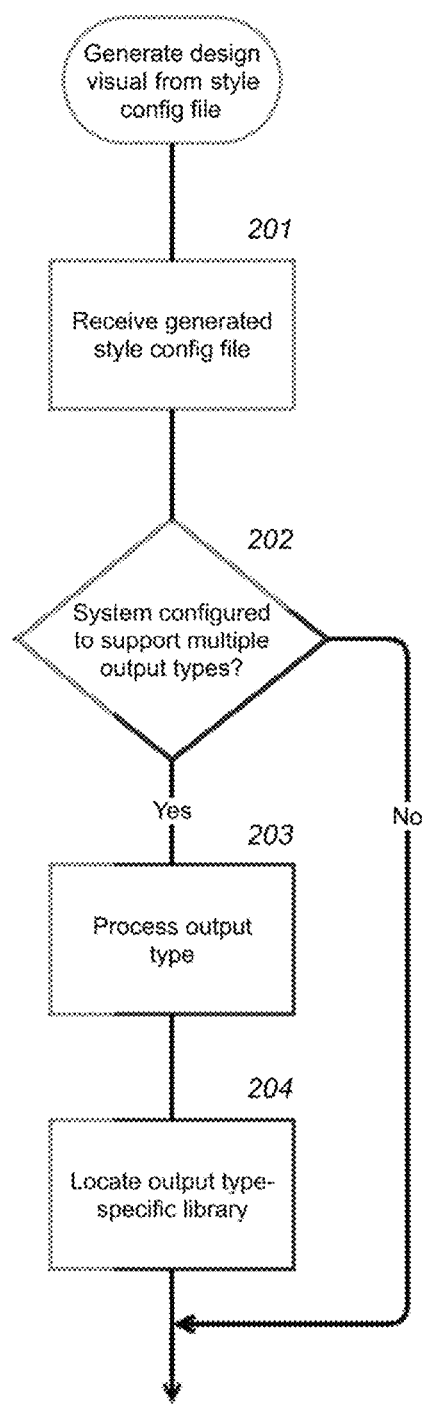
FIG. 2A, 2B illustrates a flow diagram to generate a design visual from a style configuration file by a rendering engine in one embodiment of the present invention.
Figure 2B:
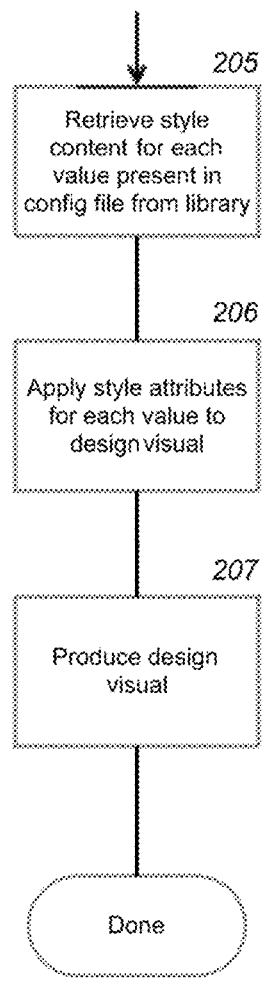

FIG. 2 illustrates a flow diagram to generate a design visual by a rendering engine from a style configuration file in one embodiment of the present invention. The system receives a request to generate a design visual from a style config file by first receiving a style config file that has already been generated 201. In an embodiment of the present invention, a system is configured to produce a design visual by a rendering engine of more than one output type of style config file. If the system 202 is configured to produce more than one output type design visual, the system will process the "output-type" data found in the style configuration file 203 and locate the corresponding library of values 204 for the requested output type. If the system 202 is not configured to support more than one output type design visual, the system may not need to process the "output-type" data from the config file because it may be assumed or known by the system.

The system will process the config file by reading the values for each top-level style and retrieve content associated to or stored with the values 205 from the library. The content associated to or stored with a value in the library comprises: an output type, a top-level style, a category, a subcategory, subcategories, a title, a name, an instruction, a description, an image, software code, dependent values, function parameters, assets, files, text, links, multimedia content, or one or more combinations thereof. In one embodiment of the present invention, the system will be configured to produce a design visual representation of the styles in the config file in a specific output format, such as a web page, a vector image, an image, a video, a file, a software program, a file for a software program, or one or more combinations thereof. The supporting value contents will be structured and stored in the library based on the output type(s) & output format(s) supported by the rendering engine. The system will follow the configuration and sequence unique to its output type & output format, retrieve the style content for each value in the config file 205 and apply the styles and content to the design visual structure 206. Once the sequence or steps to produce a design visual based on the system's supported output type(s) & output format(s) are complete, the system will produce the design visual 207. The design visual, which will represent an artifact possessing the styles of the values found in the config file, produced by the system will be observable by a user.

A Styles Library

Figure 3:
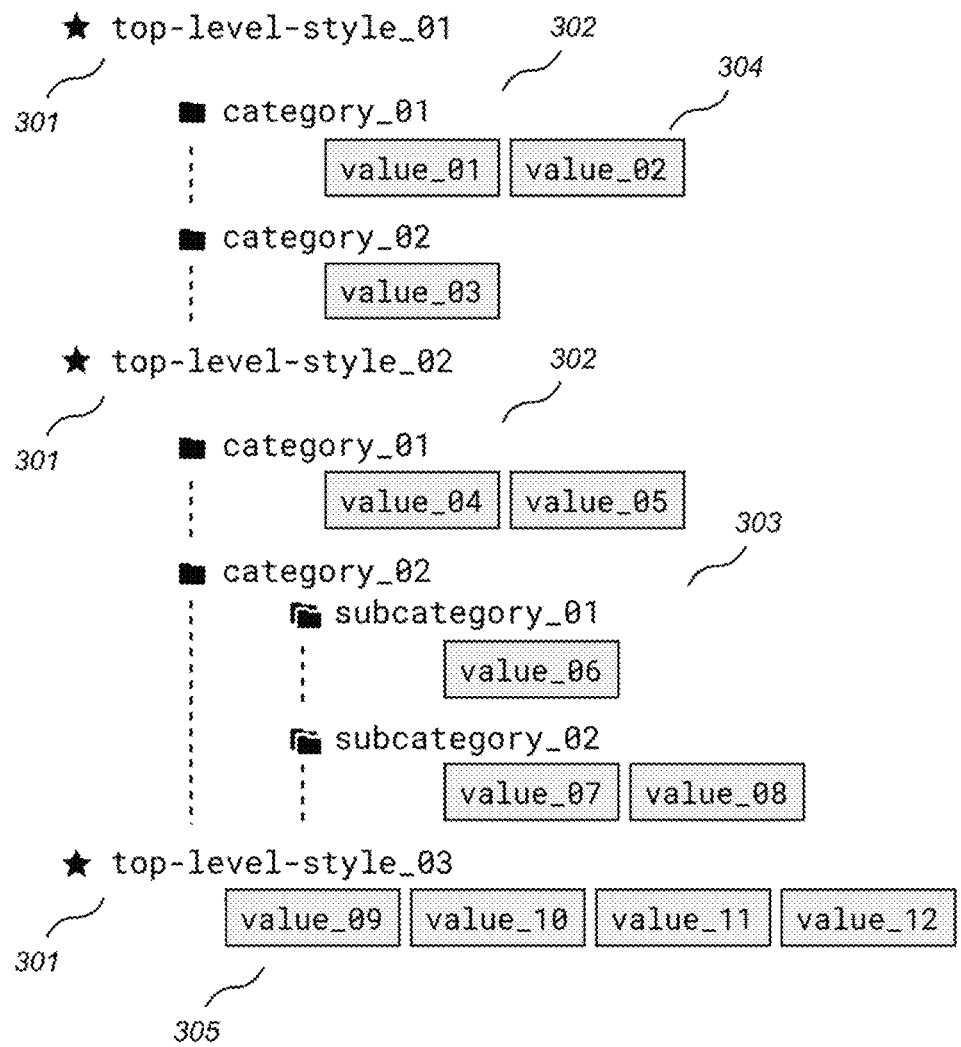
FIG. 3 illustrates a structure & hierarchy of a library of values.

FIG. 3 illustrates a structure & hierarchy of a styles library. A library is a collection of one or more values relating to an output type organized by top-level styles. A value in the library has a top-level style 301 and a name 304. In an embodiment of the present invention, a value has a category system, classification system, folder structure, or one or more combinations thereof. As part of the category system, a value may be organized into categories 302 and subcategories 303, with no limit to depth, e.g. a value can be within any number of categories, subcategories and sub-subcategories, etc. Alternatively, a value can be present directly under the top-level style 305 without any additional categorization. The categorization of values under a top-level style is flexible and may or may not contain any number of categories, or a combination thereof.

In an embodiment of the present invention, a value of the library represents multimedia content, a style, a shape, a layout, a structural element, a component, a texture, a sound, a dimension, a size, a color, an image, a spacing, a GUI element, an appliance, an accessory, a physical object, a digital object, data, text, an arrangement, a sequence, an animation, an order, an objective, a goal, a material, or one or more combinations thereof.

The presence, hierarchy and relationship of values in a styles library may be derived from the content stored with a value. The structure of FIG. 3 is a visual representation for illustrative purposes only, and should not be interpreted as the medium by which a library must be formatted in order to achieve the purposes of the invention.

Style Configuration Request Variations

Figure 4:
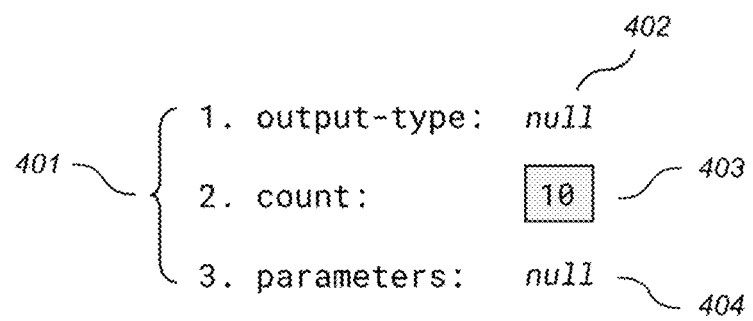
FIG. 4 is a style configuration request without an output type, parameters or explicitly defined top-level styles.

FIG. 4 is a style configuration request without an output type, parameters or explicitly defined top-level styles. In an embodiment of the present invention, a style configuration file request includes "output-type," "count", and (if applicable) "parameters" 401. If a system is not configured to support the production of more than one output type, or if the system is configured to support the production of more than one output types but there is an alternate means to understanding the output type intended to be produced by the system, such as via a file name, the "output-type" data in the request may be left empty 402. A config request may include a certain number of config files the system needs to produce 403, if not pre-configured into the system. A config file can be processed without parameters 404. A configuration file may be processed without explicitly stating top-level styles.

A style configuration file will return a set of top-level styles paired with a value from the styles library in accordance with the parameters of the request, dependency logic, and the pre-configuration of the system. In an embodiment of the present invention, there are two ways to determine which top-level styles are required in the style configuration file output; explicitly stating that certain top-level styles are deemed required in the request body, or the top-level styles required is inferred from the presence of a top-level style in the library. For example, in a certain system, any top-level style found in a library is deemed required in the production of a style config file from said library. Alternatively, a request may explicitly only call for a value for certain top-level styles in a config file generation request.

FIG. 5 is a style configuration request without parameters or explicitly defined top-level styles but does include an output type. This is an example of when an "output-type" value is present in the config request 501. Explicitly stating the output type via the request may be suitable for systems configured to support the production of multiple output types or systems configured only to support the production of a single output type. The output type communicates to the system which styles library to reference to retrieve the proper top-level styles, associated values and value content.

Figure 6:
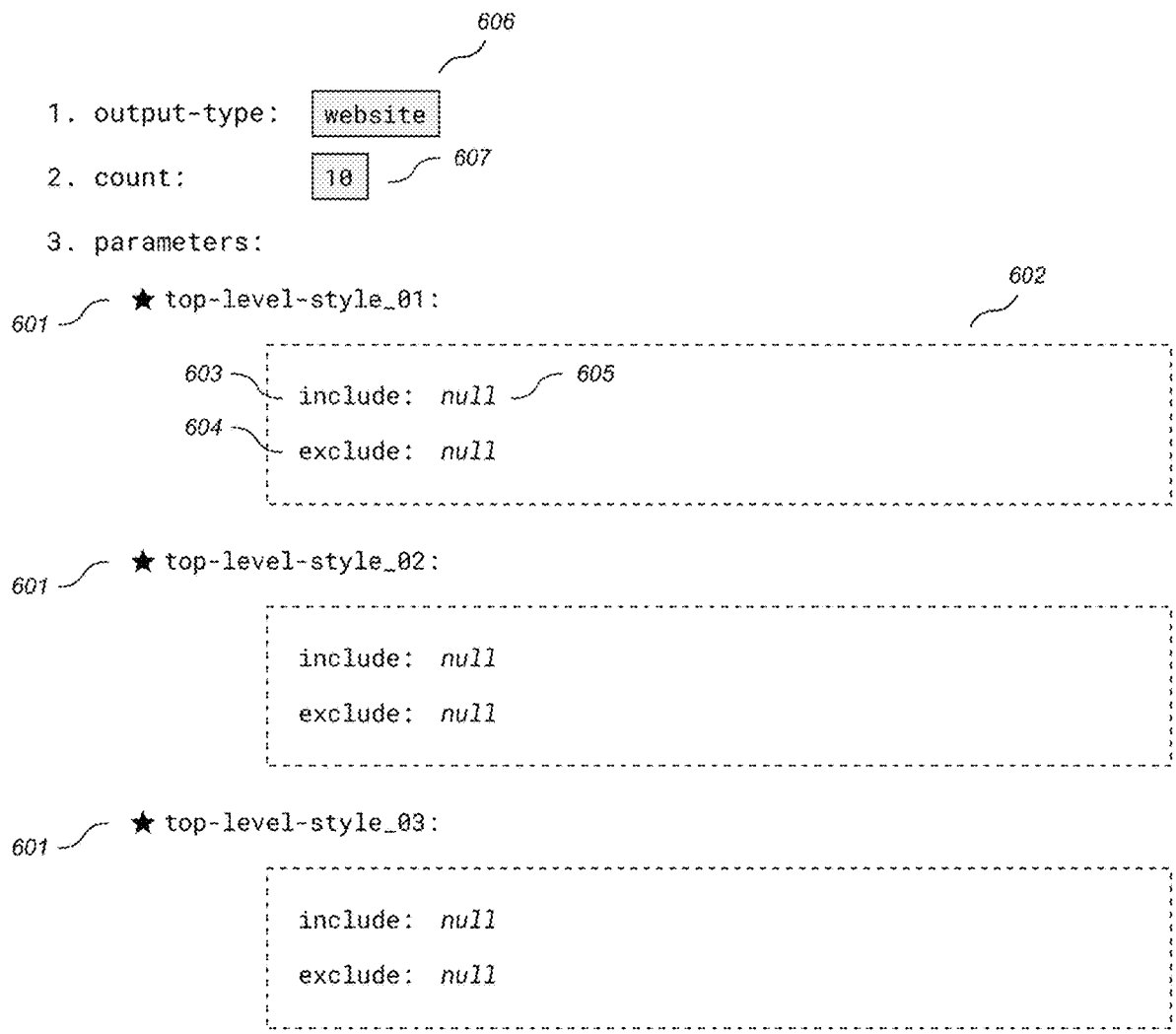
FIG. 6 is a style configuration request without parameters, but does include explicitly defined top-level styles, and an output type.
Figure 8A:
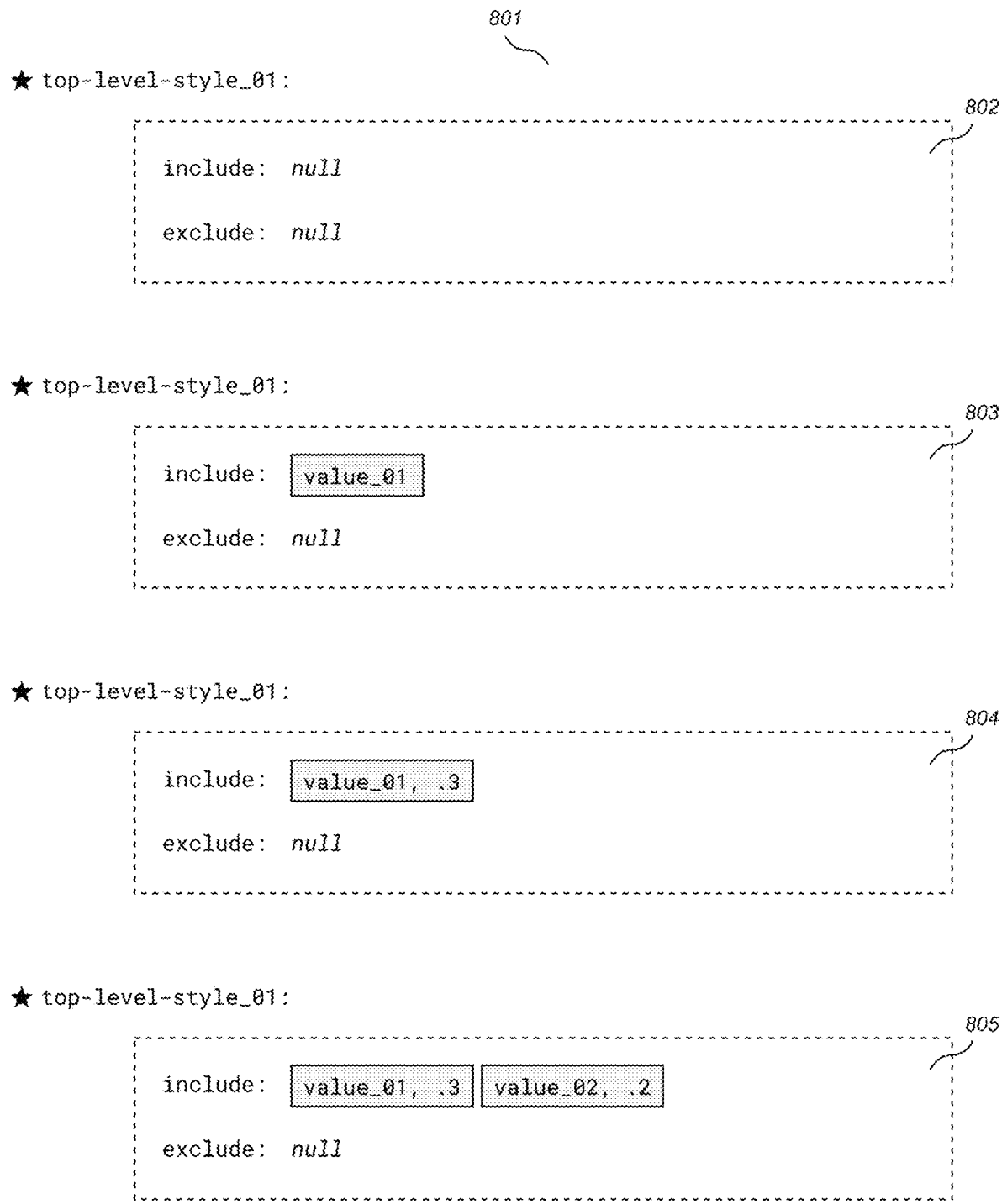

FIG. 6 is a style configuration request without parameters, but does include explicitly defined top-level styles, and an output type. Like in FIG. 5, the output type data is present in the request to produce a style config file. FIG. 6 illustrates how top-level styles 601 may be explicitly defined in the config request 602, yet the top-level values may not contain any parameters 605. It is illustrated that both types of parameter, include 603 and exclude 604, are left undefined and without content. In this scenario, the system will look to the "website" 606 styles library and select a candidate value for each of the top-level styles 601 for the 10 style config files 607 requested.

FIG. 7 is a style configuration request which includes parameters, explicitly defined top-level styles, and an output type. The illustrated request contains a variety of parameter type examples 701.

Parameter Variations

FIG. 8A-8D illustrate parameter options in a style configuration request in one embodiment of the present invention. There are many possible parameters that can be applied to generate a precise one or more style config files from the system 801. The default state of parameters for a top-level style in a style config request is null or empty, i.e. a complete absence of parameters 802. When there is an absence of parameters 802, all values found in that top-level style in the library are considered "candidate values" and can be used with equal weight in the one or more config file outputs, assuming no other logic is present in the system. For example, if there are 4 values in the top-level style "top-level-style_01", and there are no parameters applied in the request, all 4 values would be possible values used in the style config file output for this request.

In an embodiment of this invention, there are two general groups of parameters; 1) "include"/"limit to"/"distribute" and 2) "exclude"/"omit." In one embodiment of the present invention, a parameter of defining one or more specific values in the request 803 is possible. In such a case, the value designated in the "include" parameter, which in this case is "value_01" 803 would be solely present for that top-level value across all of the one or more style config files generated by the system from this request. In an embodiment of the present invention, an application for this type of parameter is if a user interacting with the system signals to the system they really like a single style and to not include any other styles in the generated style config files. In this case, the system could limit to one value from the library so only that value for that top-level style reflects in all style config files generated. Another example of the application of this parameter type would be to include more than one value, such as two values from the top-level style. In such a case, both values would solely be present for all config files produced by the request, and, in one embodiment of the present invention, the system is configured to evenly distribute the two values evenly across all config files generated by the request. In an embodiment of the present invention, an application for this type of parameter is if a user interacting with the system signals to the system they really like two specific styles and not to include any other styles in the generated style config files. In this case, the system could limit to just the two values from the library so only those values for that top-level style reflect in all style config files generated.

In one embodiment of the present invention, a parameter of limiting/including a single value for a certain percentage distribution, or by a percentage, 804 is possible. In such a case 804, "value_01" would be present in 30% of the style config files generated by the system for that request, and the remaining 70% would be populated with non-"value_01" candidate values from the library. A user can also combine a single style "include-distribution" parameter 804 with another, so several are present 805. In this case, "value_01" would be present for 30% of the "top-level-style_01" values, "value_02" would be present for 20% of the values for "top-level-style_02" and the remaining 50% of the config files would be populated with non-"value_01" and non-"value_02" values from the library. In an embodiment of the present invention, an application for this type of parameter is if a user, interacting with multiple design visuals produced from style config files, makes it clear that 50% of the samples they selected shared a top-level style value, such as a shared button style. In the next round of generating style config files, the system can reinforce the observation of that value being selected 50% of the time with a parameter including that value with a percentage of 50% in the next round of generated style config files. This means 50% of the style configs generated would contain that value, and the remaining config files would be populated with other candidate values from the library.

In one embodiment of the present invention, a parameter of limiting/including candidate values to the values of a top-level style's category 806 is possible. In such a case, the candidate values for that top-level style are limited to the values of "category_01."

In one embodiment of the present invention, a parameter of limiting/including candidate values to a certain percentage of the values of a top-level style's category 807 is possible. In such a case, the values found in "category_01" would be present in 30% of the style config files generated by the system by that request, and the remaining 70% would be populated with alternate candidate values from the library outside of "category_01." A user can also combine a single "inclusion-distribution" parameter using a category 807 with another, so several are present 808. In this case, the values found in "category_01" would be present for 30% of the candidate values of "top-level-style_01", 20% of the candidate values of "top-level-style_01" would be from "category_02," and the remaining 50% would be populated with alternate candidate values from the library outside of "category_01" and "category_02."

In one embodiment of the present invention, a parameter of limiting/including candidate values to the values of a top-level style's subcategory 809 is possible. In such a case, the candidate values for that top-level style are limited to the values of "subcategory_01."

In one embodiment of the present invention, a parameter of limiting/including candidate values to a certain percentage of the values of a top-level style's subcategory 810 is possible. In such a case, the values found in "subcategory_01" would be present in 30% of the style config files generated by the system by that request, and the remaining 70% would be populated with alternate candidate values from the library outside of "subcategory_01." A user can also combine a single "inclusion-distribution" parameter using a category 810 with another, so several are present 811. In this case, the values found in "subcategory_01" would be present for 30% of the candidate values of "top-level-style_01", 30% of the candidate values of "top-level-style_01" would be from "subcategory_02," and the remaining 40% would be populated with alternate candidate values from the library outside of "subcategory_01" and "subcategory_02."

In one embodiment of the present invention, a parameter of excluding a specific value from a top-level style's candidate values 812 is possible. An application for this type of parameter is if a user interacting with the system signals to the system they dislike one or more values and do not want to see them in any output config files generated by the system. In such a case, the value would be omitted from the candidate values and the subset of candidate values when generating a style config file, and would be absent from any generated style config files.

In one embodiment of the present invention, a parameter of excluding the values of a category from a top-level style's candidate values 813 is possible. An application for this type of parameter is if a user interacting with the system signals to the system they dislike all the values found in one or more categories and do not want to see any of those values in any output config files generated by the system. In such a case, the values found in the designated category would be omitted from the candidate values and the subset of candidate values when generating a style config file.

In one embodiment of the present invention, a parameter of excluding the values of a subcategory from a top-level style's candidate values 814 is possible. An application for this type of parameter is if a user interacting with the system signals to the system they dislike all the values found in one or more subcategories and do not want to see any of those values in any output config files generated by the system. In such a case, the values found in the designated subcategory would be omitted from the candidate values and the subset of candidate values when generating a style config file.

It is important to note that technically the parameter of 'limit' can be achieved via subtraction, or by use of the 'exclude' parameter. For example, instead of the system limiting to 'value-1' of a library, the system could circumvent the use of the 'limit' parameter by using the 'exclude' parameter and excluding all values except for 'value-1.' The same tactic could apply to circumventing the 'exclude' parameter by simply limiting to all but one value in the library. The presently disclosed invention explicitly claims that use of an alternate parameter to achieve the results of another parameter is and should be considered the same parameter, because the result is the same. In other words, leveraging the 'exclude' parameters to achieve the same results as a limit parameter constitutes a limit parameter. Similarly, leveraging a 'limit/include/percentage' parameter to achieve the same results as an exclude parameter constitutes an exclude parameter.

Sample Style Configuration File Output

FIG. 9 illustrates a sample style configuration file output from the system in one embodiment of the present invention. A system can produce a style config output in a variety of formats and with a variety of contents. In an embodiment of the present invention, a system can produce a style config output containing many generated style config files 901. A system can also produce a single style config file from the system. In the example provided, the system produced three outputs from the system 902, 903, 904. The style config files all contain the required top-level styles and a candidate value from the library for each top-level style.

In one embodiment of the present invention, the output file contains a value for all required top-level styles, but the values are not paired with the label of the top-level style. For example, if a value of a top-level style of "color-theme" were required in an output config file, rather than the output config file displaying the top-level style and value like this: "color-theme": "bright" the order or placement of the values teach the system what top-level style the value represents. In other words, a system may omit the inclusion of a top-level style label in a style config file output. In an embodiment of the present invention, each value in the library has a unique name and/or ID, so regardless of the order or placement or labeling of the resultant candidate values in the output config file, the top-level style category of the present value could be discovered by mapping the unique name and/or ID to the value in the library. In this embodiment of the present invention, a label of the top-level style is not required in the output config file; rather the contents of the output config file may just contain a series of value names and/or value IDs.

Sample Value Contents in a Library

FIG. 10 illustrates a value and its contents stored in a library in one embodiment of the present invention. The content associated to or stored with a value in the library is an output type 1001, a top-level style 1002, a category 1003, a name 1004, a subcategory, subcategories, a title, an instruction, a description 1005, an image 1006, software code 1007, dependent values 1008, function parameters 1009, assets 1010, files 1011, text 1012, links 1013, multimedia content, or one or more combinations thereof.

There is a difference worth nothing between FIG. 3 and FIG. 10. FIG. 3 illustrates the structure of the core elements needed in a library to successfully generate a style config file request, namely a set of values comprising at least of: an output type, a name, a top-level style, (if applicable) a category structure and (if applicable) dependent value(s). FIG. 10 illustrates the range of contents that can be associated with a value, primarily for the purpose of providing the rendering engine with the needed content to generate a design visual. All content outside of the essential library data, namely the output type, a name, a top-level style, (if applicable) a category structure, and (if applicable) dependent value(s) are for the purposes of other needs of the system, and the needs of a rendering engine. A value in the system consists of the output type, a name, a top-level style, (if applicable) a category structure, and (if applicable) dependent value(s) while the value contents includes all other content not essential to processing a request to generate one or more style config files. In an embodiment of the present invention, all other non-essential value data is stored in a separate content database, where values contain a unique ID. The values in the styles library containing the same unique ID could then be mapped and associated to the data in the content library.

Sample Flow for Generating Parameters from User Feedback

Figure 11:
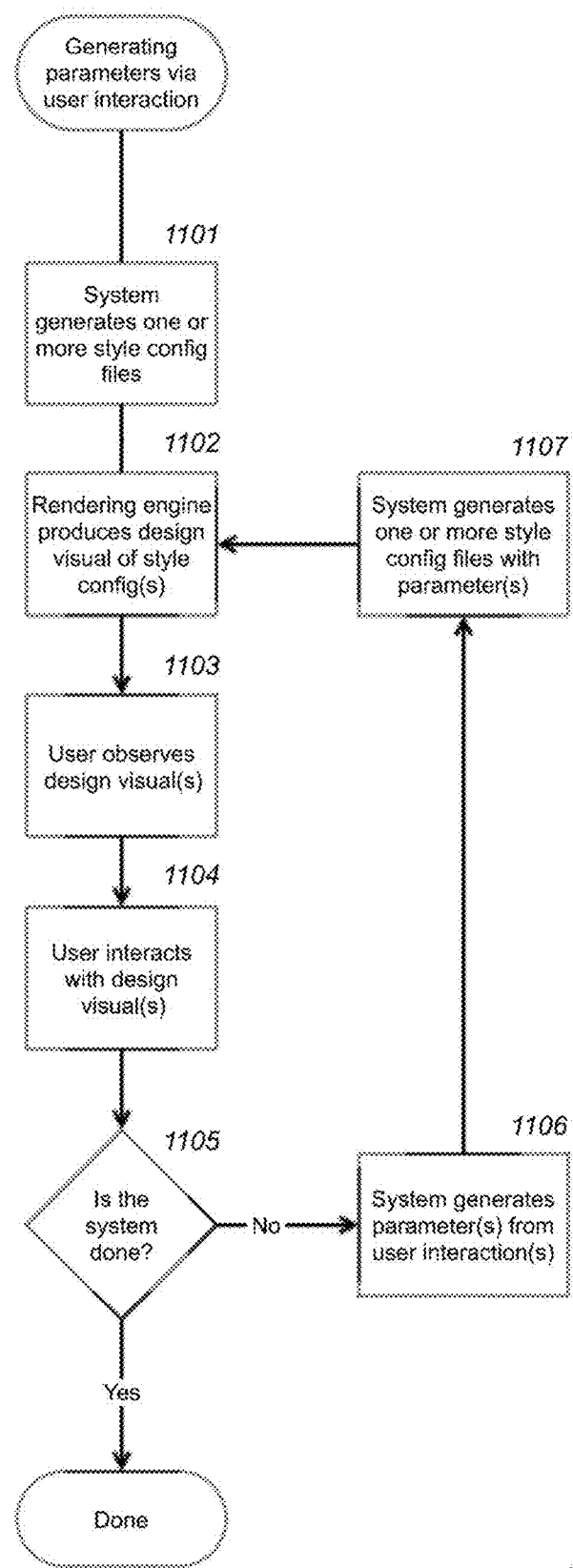
FIG. 11 illustrates a flow diagram for the system to generate parameters from one or more user interactions.

FIG. 11 illustrates a flow diagram for the system to generate parameters from one or more user interactions. There are many embodiments of the present invention. However, one key attribute of the various embodiments include the ability for the system to generate parameters by observing user interaction with the system. In an embodiment of the present invention, the system will begin by producing one or more style config files 1101, with or without parameters. A system configured to produce a design visual from the style config files (rendering engine) will produce a visual of the one or more style configs 1102. A user will observe the one or more design visuals produced 1103 via a GUI provided by the system or an external source.

The user will then interact with the design visual via a system 1104. There are a number of ways a user can interact with a design visual. The user can be asked questions or be shown options relating to the requirements, preferences and dislikes of the requested design visual. Examples of user interactions with the system include but are not limited to:

A) the user answers a question (e.g. What is your industry? Do you like this style? What is your business name? What trait represents your brand? What shape do you like? What shape do you dislike?);

B) the user makes a selection (e.g. Choose the traits that represent your brand. Choose the visual that represents the word "bold." Select the one you like. Select the one you do not like.);

C) the user taps on an object;

D) the user chooses between more than one option (e.g. Which style(s) do you like? Do you like A or B more? Which of the two, A or B, do you dislike more?);

E) the user engages with an artifact (e.g. Session data from a website. A gesture on a mobile app. Survey data. Artifact performance data.);

F) the time data before, during, after, and between one or more interactions;

G) the absence or reluctance of a user's interaction (A-E above);

H) interactions of other users;

I) one or more combinations thereof.

In an embodiment of the present invention, the system can do one or more iterations through the workflow of steps (1101 through 1107) 1105. In an embodiment of the present invention, the system can begin by asking the user questions and/or observe the conditions relating to the first interaction of the user with the system to create parameters before the first set of style configuration files is generated. If the system is configured to loop through the workflow 1105, the system will observe/analyze the interaction(s) a user has made with the system and generate parameters from the observation of the interaction 1106. The system will take those parameters and generate one or more style configuration files with the newly generated parameters 1107. Once again, the rendering engine will produce a design visual of the style config files 1102 and the user will observe the newly updated design visuals 1103. In an embodiment of the present invention, the generated parameters 1106 can be influenced by one or more rounds of applying parameters; i.e. a second round of parameters might be applied in a unique way based on how the user interacts with the system, or how the system processes the observed user interactions.

Example Using a Library of Website Values

Figure 12:
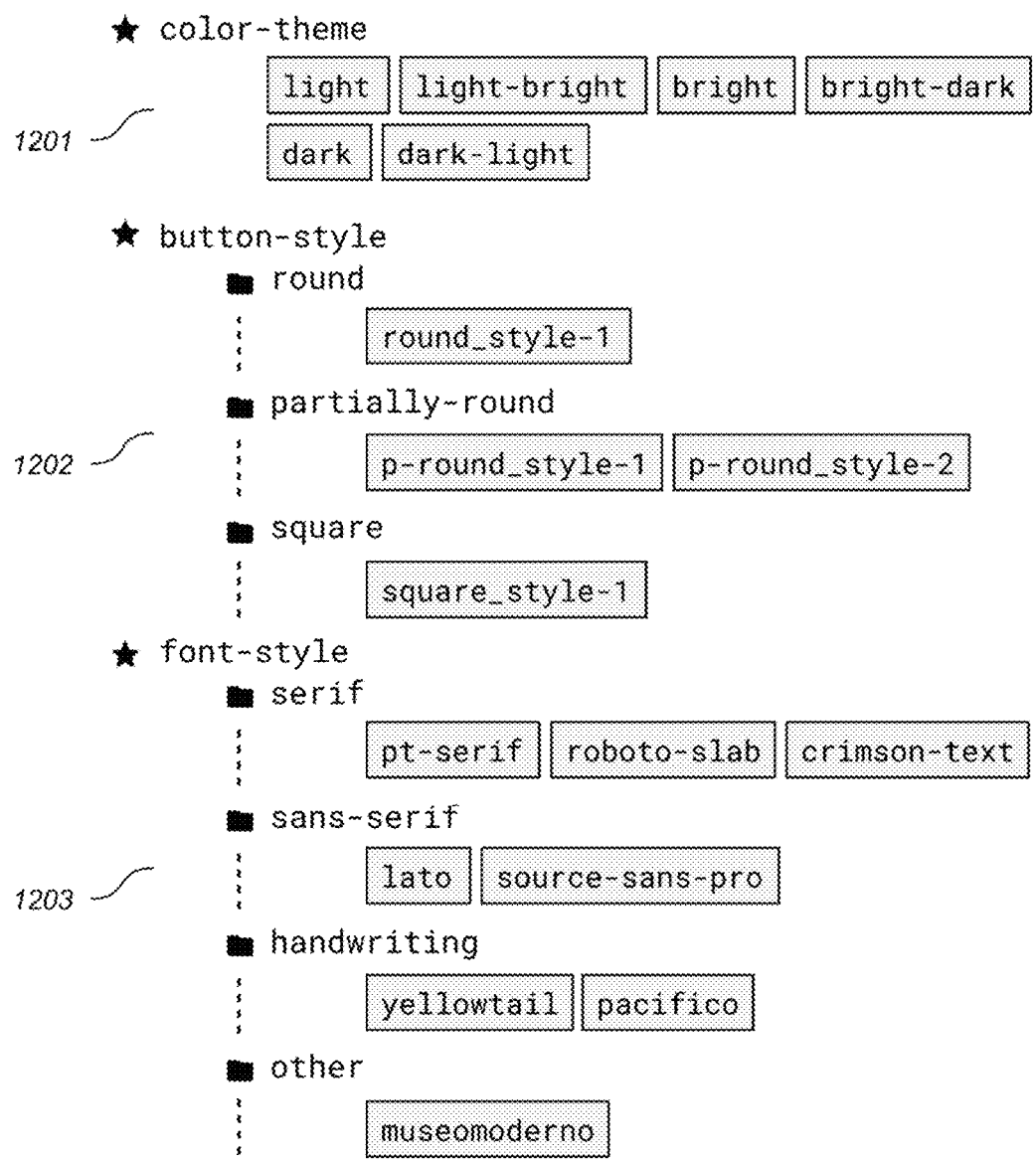
FIG. 12 illustrates a library of top-level styles and values for a website output type, representing a website artifact.

FIG. 12, FIG. 13, and FIG. 14 illustrate an end-to-end application of generating 5 style configuration files for a website output type.

FIG. 12 illustrates a real-world example of a library of top-level styles and values for a website output type, representing a website artifact. In the example, there are three top-level styles, namely "color-theme" 1201, "button-style" 1202, and "font-style" 1203. The color theme top-level style 1201 consists of 6 values, and the values do not have any categorization, rather they sit right below the top-level style. The button style top-level style 1202 consists of 4 values, and there are 3 categories within the top-level style to organize the values, namely "round," "partially-round," and "square." The font style top-level style 1203 consists of 8 values, and there are 4 categories within the top-level style to organize the values, namely "serif," "sans-serif," "handwriting," and "other."

FIG. 13 illustrates a request to generate 4 style config files for a website output type from the library of values in FIG. 12. In the style config request the output type of "website" is made explicit 1301. The number of config files requested to be generated is 4 1302. Each top-level style has one or more parameters that will apply to the values in the library. For the "color theme" top-level style, there is an "include" parameter, where the system is explicitly directed to only make the values "bright" and "bright-dark" candidate values from the library 1303. Only these two values will appear in the generated style config files for the top-level style of "color-theme." For the "button-style" top-level style, there is an "include-distribution" or "distribute" or "include by a percentage" parameter, where the system is explicitly directed to include the values found in the category of "round" for 50% of the generated style config files 1304. For the remaining 50% of generated style config files, all other values in the library under the top-level style of "button-style," minus the values in the category of "round", are candidate values. For the "font-style" top-level style, there is an "exclude" parameter present, where the system is explicitly directed to exclude all values from the category of "handwriting" from candidate values 1305. No values within the "handwriting" category of the top-level style "font-style" will be present in the output style config files.

FIG. 14 illustrates the output config files produced from a request to generate 4 website style config files, as reflected in the request illustrated in FIG. 13. The output contains the output-type of "website" 1401 and 4 unique style config files generated by the system 1406. The values contained in the illustrated output config files are all candidate values from the request made in FIG. 13 and reflect the parameter processing and distribution of the system. Each of the config files generated, namely "config-file_01" 1402, "config-file_02" 1403, "config-file_03" 1404 and "config-file_04" 1405 possess a unique combination of values from the library. Each configuration, when processed through a rendering engine to produce a design visual, will reflect a unique visual and something a user can observe, critique and interact with.

FIG. 12, FIG. 13, and FIG. 14 clearly illustrate, in an embodiment of the present invention, a real-world application of the system to generate one or more style configuration files for an output type, namely a website. The proposed use case demonstrates how a system can be configured, according to the embodiment disclosed, to produce a style configuration file for a website output type.

Distribution Logic

In one embodiment of the present invention, the system is configured to distribute candidate values from the library across style configuration files equally. It's important to note that, absent a parameter to bias the distribution of any candidate value among style config files, the distribution of candidate values should be equal. For example, if the request called for 10 style configs to be generated and 'top-level-style-1' had two values as candidate values (style-A, style-B), and 'style-A' was placed in the top-level-style-1 placement in 9 of the 10 config files generated by this request, this would give 'style-A' a bias in the style configs that was not explicitly made through a distribution parameter in the style config request. 9 of the 10 style configs would inexplicably display 'style-A' for 'top-level-style-1'. Instead, for the described use case above, by default, 5 config files should have 'style-A' and 5 should have 'style-B' for 'top-level-style-1.'

In one embodiment of the present invention, the system is configured to distribute candidate values from the library across style configuration files in random order. The distribution order or placement of candidate values among config files should, by default, be random; unpredicted, not consciously defined by a user, or not immediately known to the user. For instance, the system is requested to generate 5 config files, and there are two top-level styles needing values in each of the 5 config files. In this example, there are 5 unique candidate values for the first top-level style and 5 unique candidate values for the second top-level style. By not randomizing the order of the placement of the candidate values among style config files, the user might see the same combination of values if they interact with the system different times; style-A-1 (top-level-style-1) would be paired with style-B-1 (top-level-style-2) in style config 1, style-A-2 (top-level-style-1) would be paired with style-B-2 (top-level-style-2) in style config 2, etc. By randomly shuffling the distribution order of candidate values among style configs, the system can produce combinations not obvious to the system or end user, which will produce new and unexpected results.

Computer System & System Architecture

The invention can be implemented in digital electronic circuitry, or in computer hardware, firmware, software, or in one or more combinations of them. Apparatus of the invention can be implemented in a computer program product tangibly embodied in a machine-readable storage device for execution by a programmable processor; and method steps in the invention can be performed by a programmable processor execution a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and optical disks. Any of the foregoing can be supplemented by, or incorporated in, ASICs (application-specific integrated circuits).

Figure 15:
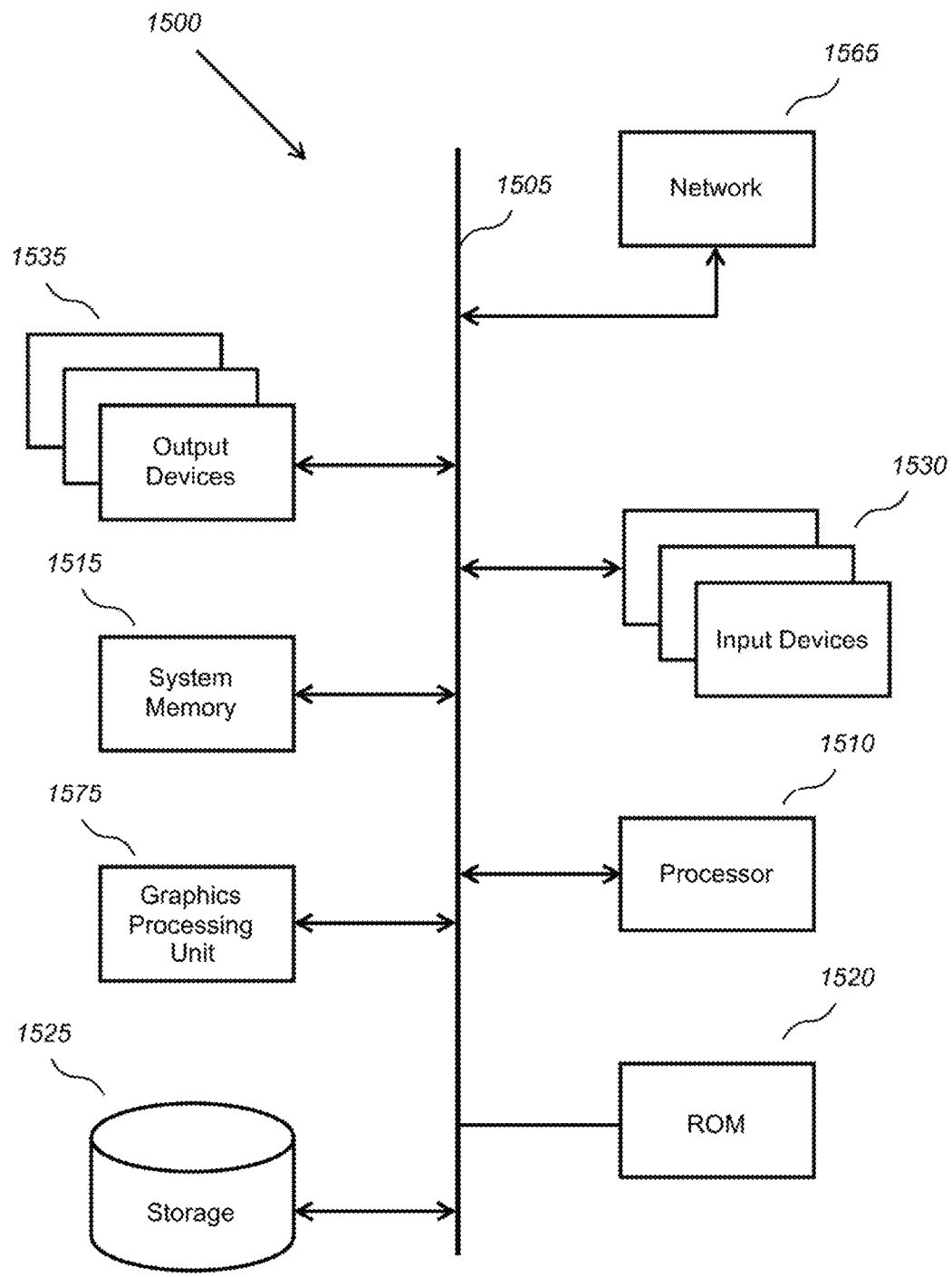
FIG. 15 is a detailed view of the system architecture of an embodiment of the invention.

FIG. 15 conceptually illustrates a computer system with which some embodiments of the invention are implemented. The computer system 1500 includes a bus 1505, a processor 1510, a system memory 1515, a read-only memory 1520, a permanent storage device 1525, input devices 1530, and output devices 1535. In some embodiments, the computer system also includes a graphic processing unit (GPU) 1575.

The bus 1505 collectively represents all system, peripheral, and chipset buses that support communication among internal devices of the computer system 1500. For instance, the bus 1505 communicatively connects the processor 1510 with the read-only memory 1520, the system memory 1515, and the permanent storage device 1525.

From these various memory units, the processor 1510 (also referred to as central processing unit or CPU) retrieves instructions to execute and data to process in order to execute the processes of the invention. The read-only-memory (ROM) 1520 stores static data and instructions that are needed by the processor 1510 and other modules of the computer system.

The permanent storage device 1525, on the other hand, is a read-and-write memory device. This device is a non-volatile memory unit that stores instruction and data even when the computer system 1500 is off. Some embodiments of the invention use a mass-storage device (such as a magnetic or optical disk and its corresponding disk drive) as the permanent storage device 1525. The permanent storage device 1525 may be a fully solid-state storage, a conventional "spinning magnetic pallet" storage (i.e. hard-drive), or combinations thereof.

Other embodiments may use a removable storage device (such as a USB flash drive or SD Memory Card) as a temporary storage or as the permanent storage device 1525.

Like the permanent storage device 1525, the system memory 1515 is a read and write memory device. However, unlike storage device 1525, the system memory is a volatile read-and-write memory, such as a random-access memory. The system memory stores at least some of the instructions and data that the processor needs at runtime.

Instructions and/or data needed to perform processes of some embodiments are stored in the system memory 1515, the permanent storage device 1525, the read-only memory 1520, or any combination of the three. For example, the various memory units may contain instructions for processing multimedia items in accordance with some embodiments. From these various memory units, the processor 1510 retrieves instructions to execute and data to process in order to execute the processes of some embodiments.

The bus 1505 also connects to the input and output devices 1530 and 1535. The input devices enable the user to communicate information and select commands to the computer system. The input devices 1530 include alphanumeric keyboards, touch panels, and cursor controllers. The input devices 1530 also include scanners through which an image can be input to the computer system. The output devices 1535 display images generated by the computer system. The output devices may include printers, pen plotters, laser printers, ink-jet plotters, film recorders, and display devices, such as cathode ray tubes (CRT), liquid crystal displays (LCD), or electroluminescent displays.

As shown in FIG. 15, bus 1505 also couples computer 1500 to a network 1565 through a network adapter (not shown). In this manner, the computer can be a part of a network of computers (such as a local area network ("LAN"), a wide area network ("WAN"), or an Intranet) or a network of networks (such as the Internet). Finally, the computer system in some embodiments also optionally includes a graphics processing unit (GPU) 1575. A GPU (also referred to as a visual processing unit or a display processor) is a dedicated graphics rendering device which is very efficient in manipulating and displaying computer graphics. The GPU can be included in a video card (not shown) or can be integrated into the mother board of the computer system along with the processor 1510. Also, the computer system 1500 may be used as a personal computer, a workstation, a game console, or the like. Any or all of the components of computer system 1500 may be used in conjunction with the invention. However, one of ordinary skill in the art will appreciate that any other system configuration may also be used in conjunction with the invention.

Having thus described several embodiments for practicing the inventive method, its advantages and objectives can be understood. Variations from the drawings and description can be made by one skilled in the art without departing from the scope of the invention, which is to be determined from the following claims.

Accordingly, this invention is not to be limited by the embodiments as shown in the drawings and/or as described in the description, since these are given by way of example only and not by way of limitation.

Definitions

Where the definition of terms departs from the commonly used meaning of the term, applicant intends to utilize the definitions provided below, unless otherwise indicated.

For the purposes of the present invention, the term "artifact" refers to anything (a digital or non-digital object) that is not naturally occurring in nature. While this should not be interpreted as a full and complete list, the following are examples of real-world artifacts specifically relevant to this invention: a website, a web page, an advertisement, a brand, a visual language, a logo, a design system, a graphical user interface, a concept, a style tile, a themeboard, a moodboard, a component library, a blog, a landing page, a sales page, artwork, a graphic design, an email template, a presentation, a theme, a business card, a marketing asset, an interior home design, an architectural structure, an automobile, a piece of clothing, a fashion design, a film, a storyboard, a video, a cartoon, a musical composition, a landscape, a product, a product packaging, a software program, a mobile app, or one or more combinations thereof.

For the purposes of the present invention, the terms "style configuration file," "style config file," "config file," "configuration file," or "style config" (collectively and interchangeably referred to hereafter as "style config file") refers to a file containing a description, notation or summary of one or more observable style traits of an artifact. A style config file itself is not the artifact it describes. A style config file has a specific structure, consisting of at least an output type, one or more top-level styles and, for each top-level style in the file, a candidate value from the library. A style config file is not a CSS (cascading style sheet or style sheet) file, however a style config file could be used to produce a CSS file.

For the purposes of the present invention, the term "request," "config request," "style config request," or "style config file request" refers to an ask or call by a user or system to generate a style config file.

For the purposes of the present invention, the term "library," "styles library," "library of values," or "library of styles" (collectively and interchangeably referred to hereafter as "library") refers to one or more values stored in a database, wherein each value is associated with a top-level style. For example, a website may have 3 top-level styles, namely "button-style," "font-style," "color-theme." For each top-level style, there are a number of possible values. For example, for the "button-style" top-level style there are values like "round," "partially-round," and "square," etc. For the "font-style" top-level style, in the library there are values like "pairing-1 (HouseSlant, Inter)," "pairing-2 (Shrikhand, Inter)," "pairing-3 (Permanent Maker, Helvetica Neue)," etc. For the "color-theme" top-level style in the library there are values like "light," "light-bright," "bright," etc. These values stored within their respective top-level styles constitute a library.

For the purposes of the present invention, the term "top-level style" refers to a label applied to one or more library values that represent an observable, distinctive style trait of an artifact. A top-level style labels interchangeable values in a library. For example, a website has a color theme; a website could be generally white (light), or generally a rich color like blue (bright), or generally a dark color with light text on top of it (dark). The application of color in this example, would be a top-level style called "color-theme." The term "color-theme" in this context would serve as a label under which a user or system could populate with various style options that would serve as the color theme values for a given config file. For example, in a config file, "color-theme" acting as a top-level style, would require a value from the library to know how to style the design visual. Like the example above, possible values in the library might include "light," "bright," "dark," etc. Any value associated to that top-level style that also qualifies as a candidate value would satisfy that top-level style in the style config file. When a style config file is generated, a candidate value from the library is required for each top-level style so a user or system can produce a visual of that output to completion. Not having a value for each top-level style would mean a failed explanation of what the style traits of the design visual should look like.

For the purposes of the present invention, the term "value" or "style value" refers to a style in the database consisting of the output type, a name, a top-level style, (if applicable) a category structure, and (if applicable) dependent values. For example, if "button-style" were a top-level style in a library, the styles stored as button styles top-level styles, such as "round," "partially-round," "square," etc., would be the values under "button-style." These values ("round," "partially-round," "square," etc.) describe a specific style or form the "button-style" top-level style could take in a style config file.

For the purposes of the present invention, the term "candidate value" refers to a value from a library that satisfies the parameters in a request to generate a style config file. A candidate value can be used to satisfy a top-level style in the generation of a style config file. For instance, say there is a library of styles wherein the top-level style is "button-style" and the values associated to it include "round," "partially-round," "square," etc. These values are not yet candidate values. If a request is made to generate 10 style config files, and in the request a parameter exists to "exclude" the value "round" from candidate values (perhaps the user dislikes rounds buttons), assuming no other parameters exist, the only two values that would be used in the generation of the style config file for the top-level style "button-style" would be "partially-round" and "square." "partially-round" and "square" are now candidate values, because they satisfy all parameters from the style config request, while "round" is not a candidate value and will not be found in an output style config file.

For the purposes of the present invention, the term "subset of candidate values" refers to the presence of one or more values from a library that satisfy the presence or absence of one or more parameters from which the system will draw from when producing a style config file. Like the example above in the definition of "candidate value", the one or more values that satisfy all parameters constitute the "subset of candidate values," or, more specifically, "partially-round" and "square."

For the purposes of the present invention, the term "parameter" refers to an instruction passed via a config request for the system to limit, exclude, include by a percentage (or one or more combinations thereof) values from a library, which will designate values as candidate values before a style configuration file is generated. Parameters can instruct the system to limit/exclude/distribute values based on the value name, value categorization, attributes of a value, contents of a value, or a combination thereof. The parameter to "limit" refers to explicitly including one or more values from a library as candidate values when generating one or more style config files. The parameter to "exclude" refers to explicitly excluding one or more values from a library as candidate values when generating one or more style config files. The parameter to "distribute by a percentage" or "include-distribution" refers to explicitly including one or more values from a library as candidate values by a percentage when generating one or more style config files.

For the purposes of the present invention, the term "output type" refers to an artifact for which a style config file is generated for and/or represents. For example, if the output type were to be "website," the associated library would contain top-level styles and values reflecting that of an interactive website used by a company to promote their products, services or ideas. If the output type were to be "moodboard," the associated library & contents would reflect a moodboard concept a designer could present to a client to illustrate directions in an overall design approach. If the output type were to be "automobile," the associated library would contain top-level styles and values reflecting that of vehicle types, accessories, colors, shapes, sizes, etc. that could be used to generate a design visual by a rendering engine configured to produce a design visual of an automobile. An output type can be any artifact the system supports.

For the purposes of the present invention, the term "category" refers to a label used to distinguish values having particular shared characteristics under a top-level style. For example, in an embodiment of the present invention, in a library with the top-level style of "font-style," the library values may be organized into categories within "font-style." Examples of such categories under "font-style" might include general styles of fonts, such as "serif," "san-serif," "display," "hand," "mono-spaced," "other," etc. Then under such a category as "serif" fonts that have serif attributes can be listed. A category can be used to describe or label traits and/or attributes shared between values in a library, wherein the category is scientifically or empirically defined.

For the purposes of the present invention, the term "subcategory" refers to a label used to distinguish values having particular shared characteristics within a category or subcategory under a top-level style. In an embodiment of the present invention, a library might further organize values within categories under categories, depending on the complexity of traits or number of values present in the library. Like a category, a subcategory can be used to describe or label traits and/or attributes shared between values in a library, wherein the subcategory is scientifically or empirically defined.

For the purposes of the present invention, the term "dependent value" refers to a value which relies on the selection of another value in an output style config file before the value can be used in the same output style configuration file. In an embodiment of the present invention, the configuration of a system to incorporate the logic of dependent values (dependency logic), which will be a criteria that needs satisfying before a candidate value can be used in a style config file, is independent of the role of parameters in designating a value as a candidate value. In other words, even if there are no parameters present but a specific candidate value is dependent on the selection of another candidate value in an output style config file before it can be used, a candidate value can be omitted from use in a style config file. This is because the presence of a specific independent value and dependent value in the same style config file may be incompatible. For example, the values of the top-level style "color-theme" (how colors used are applied to a design visual) may be dependent on the values of the top-level style of "color-palette" (the colors used in a design visual). The system may generate a color palette and, if the color palette, when processed, does not produce a color theme that matches a possible color theme value in the library, that one or more color theme values are not possible candidate values under the used color palette value for a style config file.

For the purposes of the present invention, the term "independent value" refers to a value which does not rely on the selection of another value in an output style config file before the value can be used in the same output style configuration file.

For the purposes of the present invention, the term "design visual" refers to a visual representation of an artifact reflecting the style values found in a style config file. For example, here is a possible style config file for an output type of "website:"

config-file: {
   "color-palette": "blue",
   "color-theme": "bright",
   "button-style": "style-1",
   "imagery-style": "style-23",
   "text-inputs": "style-3",
   "font-style": "inter-font"
}

A system configured to be compatible with a rendering engine can process the values present in the style configuration file and produce a design visual. The visual generated would represent an artifact possessing the style traits of the values in the style config file. When the system or method 'produces a design visual from a style configuration file,' it is intended to mean that the design visual produced by a rendering engine represents an artifact possessing the style traits of the values in the style config file. The color palette would contain "blue." The color theme would be a "bright"

style color theme. The button style would reflect the "style-1" in the visual. The imagery style visually present in the design visual would be that of "style-23." Text inputs would reflect "style-3." And the font combination would show the presence of the font family of "inter-font." A design visual is not necessarily the final artifact it portrays. For example, the rendering engine can produce an image of the visual (including but not limited to PNG, JPG, PDF, 3D rendering/file, VR rendering/file or a visual in another medium that shows what the artifact would look like if produced) but that visual is not necessarily the final artifact. The rendering engine can produce an image of a website, for instance, but an image of a website is not a website. A website is a series of software, image and multimedia content files executing in a web browser from a local or remote server. Just as a design visual rendering of a car design is not a car (physical object), so is a design visual of a website not a website. For an artifact represented by a style config file that is a musical composition, the system can generate a sound sample in lieu of a visual. There is a distinct difference between a design visual and an artifact.

For the purposes of the present invention, the term "static content" refers to content stored in a database associated with a value that will supply the needed elements to generate a design visual of an artifact by a rendering engine. Static content is content that has been previously generated and does not change unless a user or system changes it. For example, a library representing a website artifact might have a top-level style of "font-style." A value stored within "font-style" might include the value of "inter-font." The content stored with this value could be a name, a URL to a font file, etc. The value of "inter-font" is static because the font name and URL stored in the database were previously generated and will not change unless a user or system changes it.

For the purposes of the present invention, the term "dynamic content" refers to content that is not statically stored in a database with a value. Dynamic content is generated by a system, user, function or process, from one or more internal and external sources that will supply the needed elements to generate a design visual of an artifact by a rendering engine. For example, a library representing a website artifact might have a top-level style of "color-palette." A value stored within "color-palette" might include the value of "blue." In an embodiment of the present invention, the system will use the value of "blue" as an input into another system that can generate a color palette containing one or more colors that have a blue hue. "blue" as a value in the database is an example of an input needed to generate dynamic content because the color palette that will be used in the style config file is not the value of "blue," but it is the color palette that will be generated using "blue" as an input by another system; in this case the separate system is a computer-implemented color palette generator. The color palette generated is not the value of "blue" stored in the database. The dynamically-generated color palette by another system is the needed element to generate a design visual by a rendering engine.

For the purposes of the present invention, the term "rendering engine" refers to a system with the capabilities of producing a design visual from static and/or dynamic value content. The rendering engine can produce an image of the design visual that shows what the artifact would look like if produced which includes but is not limited to a PNG image, a JPG image, a PDF image, a 3D rendering, a VR rendering and/or image data in another medium and/or file format.

For the purposes of the present invention, the term "observe," "observation," or "observation by the system" (collectively and interchangeably referred to hereafter as "observation") refers to the system recording and/or saving the interaction data of a user with the system. For example, if the system asks a user a question, and the user answers the question, the system taking note, recording or saving the data around the interaction of the user answering the question, including the answer to the question, is an observation.

For the purposes of the present invention, the term "interaction," "interaction of a user," or "user interaction" refers to an engagement or contact (or explicit lack of an interaction thereof) of a user with the system. The following are examples of types of user interactions: answer, select, tap, scroll, swipe, click read, type, paste, pause, share, talk, purchase, skip, exit, delete, clear, respond, vote, or anything a user can do with or to a software program, computer, or electronic device.

For the purposes of the present invention, the term "final artifact" refers to a digital object or non-digital object produced as a result of the production of the object from a style config file. When the system or method 'produces a final artifact from a style configuration file,' it is intended to mean that the final visual produced by a rendering engine is an artifact possessing the style traits of the values in the style config file. For example, after a style configuration file is generated for a website, a system configured to produce a final artifact can generate the images, files, software code, functions and protocols to deploy a full, interactive website online (final artifact). Another example, after a style configuration file is generated for an automobile, a system configured to produce a final artifact, such as a manufacturing plant and/or 3D printing technology, can generate the physical objects and assemble a physical car (final artifact). A final artifacts includes but is not limited to: a website, a web page, an advertisement, a brand, a visual language, a logo, a design system, a graphical user interface, a concept, a style tile, a themeboard, a moodboard, a component library, a blog, a landing page, a sales page, artwork, a graphic design, an email template, a presentation, a theme, a business card, a marketing asset, an interior home design, an architectural structure, an automobile, a piece of clothing, a fashion design, a film, a storyboard, a video, a cartoon, a musical composition, a landscape, a product, a product packaging, a software program, a mobile app, or one or more combinations thereof.

What is claimed is:

1. A system to generate one or more style configuration files on request the system comprising:
    a library holding a collection of style values for a top-level style, and
    a processor configured to:
        receive a request to generate one or more style configuration files, where the one or more style configuration files need a style value for the top-level style,
        form a subset of candidate style values from the library holding the collection of style values for the top-level style,
        generate one or more style configuration files including selecting the style value for the top-level style from the subset of candidate style values,
        return the one or more style configuration files,
        render a design visual from the one or more style configuration files,
        observe a user interaction with the design visual, generate a parameter based on the user interaction, where the request includes the parameter, and the parameter determines which style values form the subset of candidate style values, and make a new request using the parameter.

2. The system of claim 1 further comprising:

the request includes a distribution parameter, and using the distribution parameter when selecting the style value for the top-level style by distributing the subset of candidate style values across the one or more style configuration files, and return the one or more style configuration files.

3. The system of claim 2 where:

the distribution parameter instructs to distribute the subset of candidate style values across the one or more style configuration files by a percentage.

4. The system of claim 1 further comprising:

the request includes a parameter, the parameter determines which style values form the subset of candidate style values, and return the one or more style configuration files.

5. The system of claim 4 further comprising:

the library holding the collection of style values has a category of style values for the top-level style, where the category has a set of style values, the parameter specifies the category, and the subset of candidate style values includes the set of style values from the category, and return the one or more style configuration files.

6. The system of claim 4 where:

the parameter specifies to exclude a style value from the subset of candidate style values.

7. The system of claim 1 where the design visual is an image.

8. The system of claim 1 where:

the user interaction is a time between two user interactions.

9. The system of claim 1, further comprising:

using the one or more style configuration files to produce a final artifact.

10. The system of claim 1, further comprising: using the one or more style configuration files to produce a final artifact.

11. The system of claim 10 where the final artifact is a web page.

12. A process executed by a computer to generate one or more style configuration files comprising:

receiving a request to generate one or more style configuration files where the one or more style configuration files needs a style value for a top-level style, forming a subset of candidate style values from a library of style values, where the library of style values provides a collection of style values for the top-level style, generating one or more style configuration files including setting the style an value for the top-level style where the style value is from the subset of candidate style values, returning the one or more style configuration files, rendering a design visual from the one or more style configuration files, observing a user interaction with the design visual, generating a parameter based on the user interaction, where the request includes the parameter, and the parameter determines which style values form the subset of candidate style values, and making a new request using the parameter.

13. The process of claim 12 where:

the request includes a distribution parameter, and the distribution parameter is used to distribute the subset of candidate style values as the style value for the top-level style across the one or more style configuration files.

14. The process of claim 13 where: the distribution parameter instructs to distribute the subset of candidate style values as the style value for the top-level style across the one or more style configuration files by a percentage.

15. The process of claim 12, further comprising: producing a final artifact using the one or more style configuration files.

16. A system to generate one or more style configuration files the system comprising:

a library holding a collection of style values for a top-level style, and a processor configured to:

receive a request to generate one or more style configuration files where the one or more style configuration files need a style value for the top-level style, where the request includes a parameter and a distribution parameter, form a subset of candidate style values from the library holding a collection of style values where the parameter determines which style values form the subset of candidate style values and, generate one or more style configuration files including the style value for the top-level style where the style value is from the subset of candidate style values, and where the distribution parameter is used to distribute the subset of candidate style values across the one or more style configuration files, render a design visual from the one or more style configuration files, observe a user interaction with the design visual, generate a user parameter value based on the user interaction, and make a new request where the parameter is set to the user parameter value.

* * * * *